(12) United States Patent
Filatov et al.

(10) Patent No.: US 11,994,622 B2
(45) Date of Patent: May 28, 2024

(54) METHODS AND SYSTEMS FOR PROVIDING SCAN DATA FOR DECISION MAKING BY A SELF-DRIVING VEHICLE

(71) Applicant: YANDEX SELF DRIVING GROUP LLC, Moscow (RU)

(72) Inventors: Artem Andreevich Filatov, Perm (RU); Andrey Olegovich Rykov, Snezhinsk (RU)

(73) Assignee: Direct Cursus Technology L.L.C, Dubai (AE)

( * ) Notice: Subject to any disclaimer, the term of this patent is extended or adjusted under 35 U.S.C. 154(b) by 463 days.

(21) Appl. No.: 17/522,552

(22) Filed: Nov. 9, 2021

(65) Prior Publication Data

US 2022/0146640 A1 May 12, 2022

(30) Foreign Application Priority Data

Nov. 10, 2020 (RU) .................................. 2020136876

(51) Int. Cl.
*G01S 17/931* (2020.01)
*G01S 7/481* (2006.01)
(Continued)

(52) U.S. Cl.
CPC ............ *G01S 7/4817* (2013.01); *G01S 17/89* (2013.01); *G01S 17/931* (2020.01); *G06V 20/56* (2022.01)

(58) Field of Classification Search
CPC ...... G01S 7/4817; G01S 17/931; G01S 17/89; G06V 20/56
See application file for complete search history.

(56) References Cited

U.S. PATENT DOCUMENTS

| 5,031,101 A | 7/1991 | Kamimura et al. |
| 9,098,753 B1 | 8/2015 | Zhu et al. |
| (Continued) | | |

FOREIGN PATENT DOCUMENTS

| CN | 111523441 A | 8/2020 |
| RU | 2706798 C1 | 11/2019 |
| RU | 200039 U1 | 10/2020 |

OTHER PUBLICATIONS

Payton, "An architecture for reflexive autonomous vehicle control", Published in Proceedings. 1986 IEEE International Conference on Robotics and Automation, vol. 3, Jan. 1, 1986, pp. 1838-1845, XP055891182, DOI: 10.1109/ROBOT.1986.1087458.
(Continued)

*Primary Examiner* — Aryan E Weisenfeld
*Assistant Examiner* — Jeffrey R Chalhoub
(74) *Attorney, Agent, or Firm* — BCF LLP

(57) ABSTRACT

A method and system for providing scan data for decision making in a self-driving vehicle are provided. The self-driving vehicle includes a scanning sensor that scans a space around the self-driving vehicle in consecutive scanning cycles. The method includes receiving a request for scan information associated with a requested segment of space. The method determines whether to wait for a next scan of the requested segment and use scan data from the next scan, or to extract and use scan data from a previous scan of the requested segment. The method also includes processing the scan data to generate the scan information for the requested segment, providing the scan information for the requested segment in response to the request, and operating the self-driving vehicle in accordance with a decision made about a maneuver to be performed by the self-driving vehicle based, at least in part, on the scan information.

15 Claims, 9 Drawing Sheets

(51) Int. Cl.
    *G01S 17/89*     (2020.01)
    *G06V 20/56*     (2022.01)

(56) References Cited

U.S. PATENT DOCUMENTS

| | | |
|---|---|---|
| 9,383,753 B1 | 7/2016 | Templeton et al. |
| 10,088,559 B1 | 10/2018 | Weed et al. |
| 10,267,908 B2 | 4/2019 | Luders et al. |
| 10,501,085 B2 | 12/2019 | Luders |
| 2019/0041503 A1 | 2/2019 | Shand |
| 2019/0176829 A1* | 6/2019 | Luders .................. G05D 1/021 |
| 2019/0196481 A1* | 6/2019 | Tay ....................... G05D 1/0246 |
| 2019/0236955 A1* | 8/2019 | Hu ........................ H04W 84/18 |
| 2020/0064481 A1 | 2/2020 | Cen et al. |

OTHER PUBLICATIONS

Rieken et al., "Sensor scan timing compensation in environment models for automated road vehicles", Published in 2016 IEEE 19th International Conference on Intelligent Transportation Systems (ITSC), IEEE, Nov. 1, 2016, pp. 635-642, XP033028362, DOI: 10.1109/ITSC.2016.7795620, [retrieved on Dec. 22, 2016].

European Search Report dated Mar. 18, 2022 issued in respect of the European Patent Application No. 21199005.6.

Russian Search Report dated Oct. 24, 2022 issued in respect of the counterpart Russian Patent Application No. RU 2020136876.

\* cited by examiner

METHODS AND SYSTEMS FOR PROVIDING SCAN DATA FOR DECISION MAKING BY A SELF-DRIVING VEHICLE

CROSS-REFERENCE

The present application claims priority to Russian Patent Application No. 2020136876, entitled "Methods and Systems For Providing Scan Data For Decision Making by a Self-Driving Vehicle", filed Nov. 10, 2020, the entirety of which is incorporated herein by reference.

FIELD OF TECHNOLOGY

The present technology relates to computer-implemented methods and systems for providing data from a scanning device in a self-driving vehicle. In particular, the technology relates to providing recent scan data from a scanning device that scans a space around the self-driving vehicle in consecutive scanning cycles.

BACKGROUND

Self-driving vehicles rely on a variety of sensors, including various scanning devices to provide information to the self-driving vehicle on its immediate surroundings. One scanning device that is frequently used in self-driving vehicles is a LiDAR scanning system. A typical LiDAR scanning system performs cyclical scanning, so once a scanning cycle is complete, the full data obtained during that scanning cycle is made available. This process is repeated periodically, typically at a default frequency, such as every 100 ms.

This means that the LiDAR data that is used to make decisions on the operation of the self-driving vehicle could be as much as a full scanning cycle old. Assuming a 100 ms scanning cycle time, a vehicle traveling at 80 km/h will travel approximately 2.2 m in the time of a single scanning cycle. Since a typical lane width ranges from about 2.7 m to about 4.6 m, the distance traveled in a single scanning cycle may be significant for safe operation of a self-driving vehicle.

In fact, the problem may be worse than is indicated above, since once the data are scanned, they need to be processed and analyzed before decisions can be made. Depending on the types of processing and analysis that are performed, this may add a substantial delay to the information that is used to operate the self-driving vehicle. In a rapidly changing environment, such as a busy road, it is easy to see how such a delay may present a serious safety issue.

One approach to solving this problem is to attempt to use faster sensors, such as cameras, to make decisions on the operation of the vehicle. Cameras, however, provide only a two-dimensional image, without the depth information that a LiDAR system provides. This means that cameras require more computationally sophisticated approaches to analyzing the data, and there is a greater potential for error in determining, e.g., the locations of objects around the vehicle in three-dimensional space. Other approaches may involve using faster LiDAR systems to decrease the scanning cycle time and faster, specialized processing equipment to speed up the analysis. However, this may rapidly increase the cost associated with the LiDAR system and the computing devices that are used to analyze the data, which may substantially increase the cost of a self-driving vehicle.

SUMMARY

To overcome these difficulties, the developers of the present technology use a control system in which needed segments of the scan data can be quickly provided for processing prior to the completion of a full scanning cycle. The control system requests information on a segment of the space surrounding the vehicle that is needed for making a decision. Depending on the age of the data for the requested segment and the delay that will be incurred by waiting for new data for the requested segment, the control system may choose to immediately access data for the segment that has previously been scanned, or wait for new data for the segment to be scanned. This gives the control system an ability to rapidly access up-to-date data, providing safer decision making on maneuvering the self-driving vehicle.

In accordance with one aspect of the present disclosure, the technology is implemented in a method of operating a self-driving vehicle. The method is executable on a computing device associated with the self-driving vehicle, and the self-driving vehicle is equipped with a scanning sensor that scans a space around the self-driving vehicle in consecutive scanning cycles. The method includes receiving a request for scan information associated with a requested segment of space. The method also determines whether to wait for a next scan of the requested segment by the scanning sensor and use scan data from the next scan of the requested segment, or to extract and use scan data from a previous scan of the requested segment by the scanning sensor. The method also includes processing the scan data to generate the scan information for the requested segment, providing the scan information for the requested segment in response to the request, and operating the self-driving vehicle in accordance with a decision made about a maneuver to be performed by the self-driving vehicle based, at least in part, on the scan information.

In some implementations, determining whether to wait for the next scan of the requested segment includes: evaluating a first time parameter indicative of time passed since the previous scan of the requested segment by the scanning sensor; evaluating a second time parameter indicative of a time to availability of data for the next scan of the requested segment by the scanning sensor; and making a determination based, at least in part, on the first time parameter and the second time parameter. In some of these implementations, making the determination based, at least in part, on the first time parameter and the second time parameter includes comparing the first time parameter to the second time parameter and determining to use data from the previous scan of the requested segment in response to the first time parameter being less than the second time parameter. In some implementations, making the determination based, at least in part, on the first time parameter and the second time parameter includes comparing the first time parameter to the second time parameter, and determining to use data from the next scan of the requested segment in response to the first time parameter being greater than the second time parameter.

In some implementations, determining whether to wait for the next scan of the requested segment includes determining whether the requested segment has been scanned during a current scanning cycle and making a determination to use previously scanned data from the current scanning cycle for the requested segment if the requested segment has been scanned during the current scanning cycle. In some of these implementations, in response to the requested segment not having been scanned during the current scanning cycle, determining whether to wait for the next scan of the requested segment further includes evaluating a first time parameter indicative of time passed from scanning the requested segment in a previous scanning cycle and determining whether to wait for the next scan of the requested segment based, at least in part, on the first time parameter. In some implementations, determining whether to wait for the next scan of the requested segment based, at least in part, on the first time parameter includes evaluating a second time parameter indicative of a time to availability of data for the requested segment during the current scanning cycle and comparing the first time parameter to the second time parameter. In some of these implementations, in response to the first time parameter being greater than the second time parameter, a determination is made to wait for the data for the requested segment during the current scanning cycle. In some further implementations, in response to the first time parameter being less than the second time parameter, a determination is made to use data for the requested segment from the previous scanning cycle.

In some implementations, receiving the request for the scan information further comprises receiving a deadline by which the scan information associated with the requested segment of space is to be provided. In some of these implementations, determining whether to wait for the next scan of the requested segment by the scanning sensor includes: evaluating a time parameter indicative of a time of availability of data for the next scan of the requested segment by the scanning sensor; comparing the time parameter to the deadline; and in response to the time parameter indicating that the scan information will not be available by the deadline, making a determination to use data from the previous scan of the requested segment. In some of these implementations, evaluating the time parameter further includes adding a processing time to the time parameter.

In some implementations, processing the scan data to generate the scan information for the requested segment includes analyzing the scan data in a perception layer of a control system that operates the self-driving vehicle. The perception layer classifies objects around the self-driving vehicle based at least in part on the scan data. In some implementations, the decision made about the maneuver to be performed by the self-driving vehicle is made in a behavior layer of a control system that operates the self-driving vehicle.

In some implementations, the scanning sensor includes a LiDAR device. In some of these implementations, the scan data includes a LiDAR point cloud.

In accordance with anther aspect of the present disclosure, the technology is implemented in a self-driving vehicle. The self-driving vehicle includes a LiDAR device configured to scan a space around the self-driving vehicle in consecutive scanning cycles and a control system that operates the self-driving vehicle. The control system includes a computing device including a processor and a memory. The memory stores programmed instructions that when executed by the processor cause the control system to: receive a request from a behavior layer of the control system in a perception layer of the control system for scan information associated with a requested segment of space; determine in the perception layer whether to wait for a next scan of the requested segment by the LiDAR device and use scan data from the next scan of the requested segment, or to extract and use scan data from a previous scan of the requested segment by the LiDAR device; process the scan data in the perception layer to generate the scan information for the requested segment; provide the scan information to the behavior layer for the requested segment in response to the request; and operate the self-driving vehicle in accordance with a decision made about a maneuver to be performed by the self-driving vehicle in the behavior layer based, at least in part, on the scan information.

In some implementations, the memory further stores programmed instructions that when executed by the processor cause the control system to determine whether to wait for the next scan of the requested segment at least in part by: evaluating a first time parameter indicative of time passed since the previous scan of the requested segment by the LiDAR device; evaluating a second time parameter indicative of a time to availability of data for the next scan of the requested segment by the LiDAR device; comparing the first time parameter to the second time parameter; determining to use data from the previous scan of the requested segment in response to the first time parameter being less than the second time parameter; and determining to use data from the next scan of the requested segment in response to the first time parameter being greater than the second time parameter.

In some implementations, the memory further stores programmed instructions that when executed by the processor cause the control system to determine whether to wait for the next scan of the requested segment at least in part by: determining whether the requested segment has been scanned during a current scanning cycle; in response to the requested segment having been scanned during the current scanning cycle, making a determination to use previously scanned data from the current scanning cycle for the requested segment; and in response to the requested segment not having been scanned during the current scanning cycle, determining whether to wait for the next scan of the requested segment. This determination is made by: evaluating a first time parameter indicative of time passed from scanning the requested segment in a previous scanning cycle; evaluating a second time parameter indicative of a time to availability of data for the requested segment during the current scanning cycle; comparing the first time parameter to the second time parameter; in response to the first time parameter being greater than the second time parameter, making a determination to wait for the data for the requested segment during the current scanning cycle; and in response to the first time parameter being less than the second time parameter, making a determination to use data for the requested segment from the previous scanning cycle.

In some implementations, the memory further stores programmed instructions that when executed by the processor cause the control system to: receive a deadline in the perception layer, the deadline providing a time by which the scan information associated with the requested segment of space is to be provided to the behavior layer; and determine whether to wait for the next scan of the requested segment. This determination is made, at least in part, by: evaluating a time parameter indicative of a time of availability of data for the next scan of the requested segment by the LiDAR device; comparing the time parameter to the deadline; and in response to the time parameter indicating that the scan information will not be available by the deadline, making a determination to use data from the previous scan of the requested segment.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
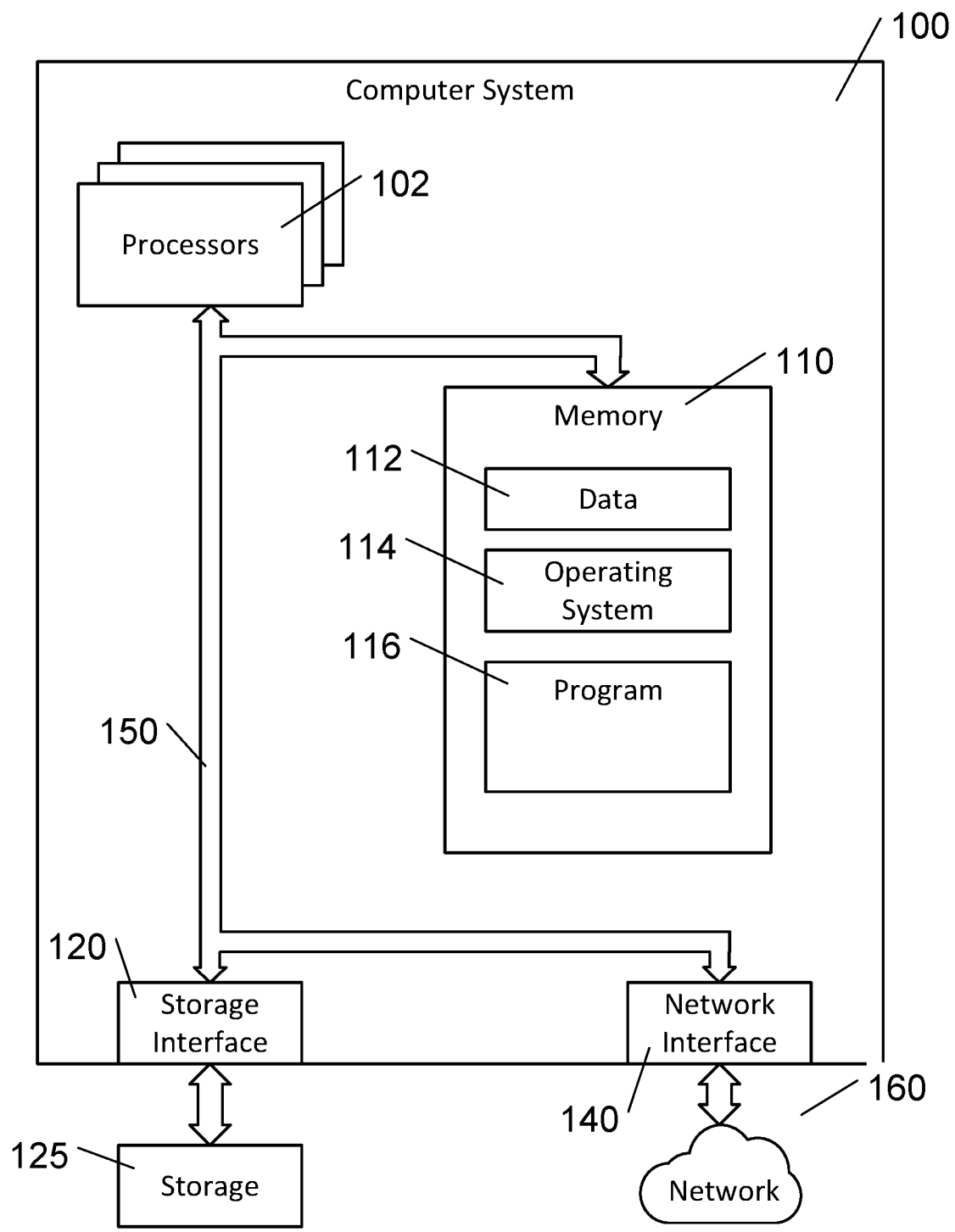
FIG. 1 depicts a schematic diagram of an example computer system for implementing systems and/or methods of the present technology.

Various representative embodiments or implementations of the disclosed technology will be described more fully hereinafter with reference to the accompanying drawings. The present technology may, however, be embodied in many different forms and should not be construed as limited to the representative embodiments or implementations set forth herein. In the drawings, the sizes and relative sizes of layers and regions may be exaggerated for clarity. Like numerals refer to like elements throughout.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments or implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in a computing/processing device may receive computer-readable program instructions via the network and forward the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to generate a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to generate a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

Computer System

FIG. 1 shows a computer system 100. The computer system 100 may be a multi-user computer, a single user computer, a laptop computer, a tablet computer, a smartphone, an embedded control system, or any other computer system currently known or later developed. Additionally, it will be recognized that some or all the components of the computer system 100 may be virtualized. As shown in FIG. 1, the computer system 100 includes one or more processors 102, a memory 110, a storage interface 120, and a network interface 140. These system components are interconnected via a bus 150, which may include one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

The memory 110, which may be a random-access memory or any other type of memory, may contain data 112, an operating system 114, and a program 116. The data 112 may be any data that serves as input to or output from any program in the computer system 100. The operating system 114 is an operating system such as MICROSOFT WINDOWS or LINUX. The program 116 may be any program or set of programs that include programmed instructions that may be executed by the processor to control actions taken by the computer system 100.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the programs 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114.

The network interface 140 is used to connect the computer system 100 to other computer systems or networked devices (not shown) via a network 160. The network interface 140 may include a combination of hardware and software that allows communicating on the network 160. In some implementations, the network interface 140 may be a wireless network interface. The software in the network interface 140 may include software that uses one or more network protocols to communicate over the network 160. For example, the network protocols may include TCP/IP (Transmission Control Protocol/Internet Protocol).

It will be understood that the computer system 100 is merely an example and that the disclosed technology may be used with computer systems or other computing devices having different configurations.

Self-Driving Vehicle

Figure 2:
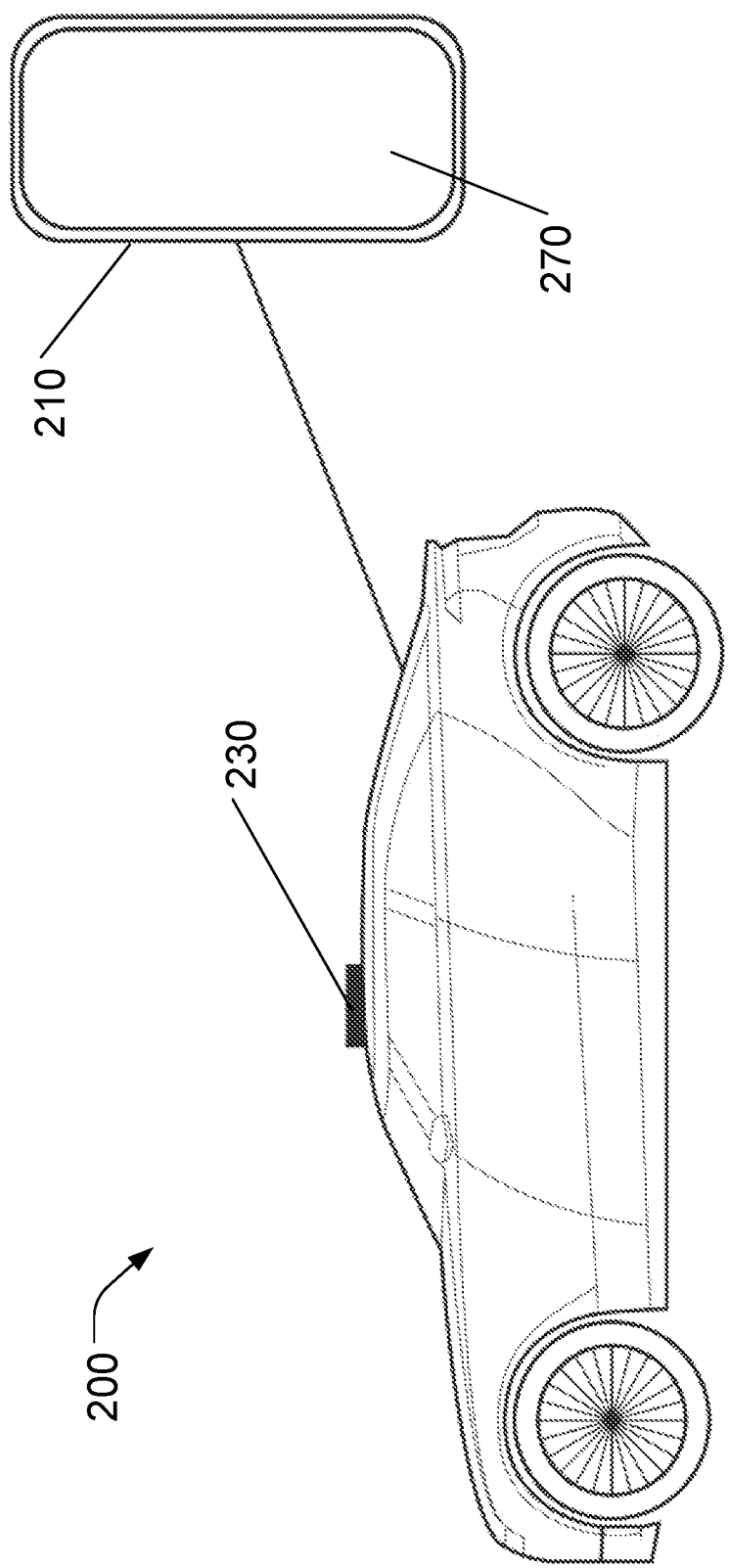
FIG. 2 depicts a self-driving vehicle suitable for use with some implementations of the present technology.

FIG. 2 shows a self-driving vehicle 200. The self-driving vehicle 200 is depicted as being a passenger car, but it will be understood that it may include other leisure or transportation vehicles, such as any variety of private or commercial car, truck, motorbike or the like. Although the self-driving vehicle 200 is depicted as being a land vehicle, the present technology is not so limited. For example, the self-driving vehicle 200 may be a watercraft, such as a boat, or an aircraft, such as a flying drone.

The self-driving vehicle 200 may be a fully self-driving vehicle, or a partially autonomous vehicle, in which a human driver controls some aspects of the vehicle's operation, while other aspects (e.g., "autopilot" on highways) are automated. It should be noted that the vehicle may have any manufacturer, vehicle model, vehicle year of manufacture, vehicle weight, vehicle dimensions, vehicle weight distribution, vehicle surface area, vehicle height, drive train type (e.g. 2x or 4x), tire type, brake system, fuel system, mileage, vehicle identification number, engine size, or other characteristics or parameters of a vehicle.

The self-driving vehicle 200 includes a computing device 210 that controls at least some aspects of the operation of the self-driving vehicle 200. The implementation of the computing device 210 is not particularly limited, but as an example, the computing device 210 may be implemented as a vehicle engine control unit, a vehicle CPU, a vehicle navigation device, a tablet, a personal computer built into the self-driving vehicle 200 and the like. Thus, it should be noted that the computing device 210 may or may not be permanently associated with the self-driving vehicle 200. Additionally or alternatively, the computing device 210 can be implemented in a wireless communication device such as a mobile telephone (e.g. a smartphone or a radio-phone). In certain implementations, the computing device 210 has a display 270.

The computing device 210 may includes some or all of the components of a computer system 100 as depicted in FIG. 1. Generally, the computing device 210 comprises hardware and/or software and/or firmware, or a combination thereof, for processing data as will be described in greater detail below. It should be noted that the computing device 210 may communicate with other computer systems (not shown) over a network (not shown), including servers and computer systems on other self-driving vehicles (e.g., in a peer-to-peer or self organizing mesh network configuration). This communication, however, should not be required for operation of the self-driving vehicle 200, since there may be situations in which the self-driving vehicle 200 may be outside of the communication range of a wireless or cellular network, or otherwise unable to communicate over a network.

The self-driving vehicle 200 also includes numerous sensors that are used to detect information about the surrounding environment, so the self-driving vehicle 200 is able to navigate within the surrounding environment. These sensors may include imaging sensors, such as one or more cameras (not shown), as well as other sensors, such as one or more of a GPS or other positioning unit (not shown), a radar (not shown), an inertial measurement unit (not shown), a sonar (not shown), and/or others sensors. Among these sensors is a LiDAR device 230. LiDAR (which stands for "light detection and ranging") is a sensor technology that actively measures distances to features in the environment to generate a point cloud that represents the three-dimensional positions and shapes of surfaces in the surrounding environment. This is done using one or more lasers that measure distances by generating a laser pulse and detecting a returning pulse, if any, reflected from an object in the surrounding environment. The pulses travel at the speed of light, so a distance to an object may be calculated based on a time delay between the emitted pulse and the return of the reflected pulse. Each such pulse measures a single point in the point cloud, and the lasers are scanned across an area to generate a point cloud in which each point represents a distance to a reflective surface in the area scanned. The LiDAR device 230 repeats these scans in a cyclical manner, so that new scans of the area covered by the LiDAR device 230 are generated periodically (e.g., a complete scan every 100 ms). The area scanned may be a complete 360 degree area surrounding the vehicle out to a range of the LiDAR device 230 (e.g., 100 m), though other scanned areas may also be used.

Sensors such as the LiDAR device 230, which scan over an area over a period of time are referred to in the present disclosure as "scanning sensors." Other examples of such scanning sensors may include radar and some sonar systems.

The sensors, including the LiDAR device 230 can be mounted at various locations on the self-driving vehicle 200, depending on the sensor type and operation of the sensor. For example, a camera (not shown) could be mounted on an interior, upper portion of a windshield of the self-driving vehicle 200, but other locations are also possible, such as on a front hood, rooftop, front grill, or front bumper of the self-driving vehicle 200. In some implementations of the present technology, the LiDAR device 230 may be mounted in a dedicated enclosure (not shown) mounted on the top of the self-driving vehicle 200.

Control System

Figure 3:
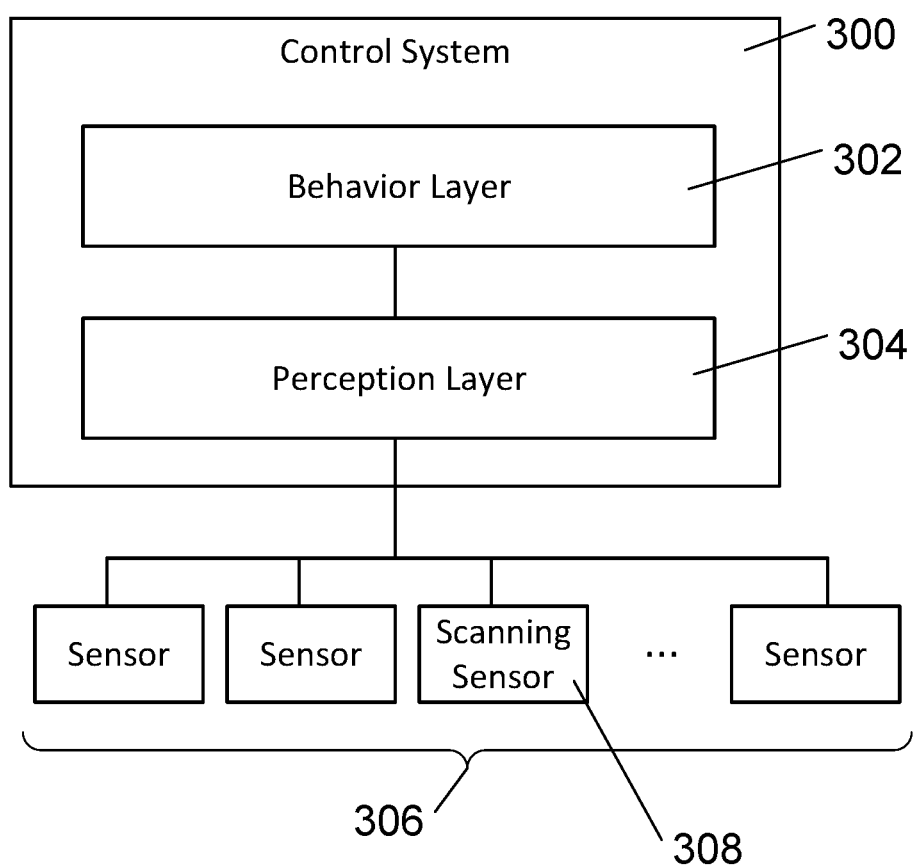
FIG. 3 is a high-level block diagram of an architecture for a control system for a self-driving vehicle, in accordance with some implementations of the present technology.

FIG. 3 shows a high-level block diagram of a control system 300 for controlling a self-driving vehicle. The control system 300 may execute on the computing device 210 of a self-driving vehicle such as is described above with reference to FIG. 2, which may be implemented using a computer system such as the computer system 100, as described above with reference to FIG. 1. The control system 300 includes a behavior layer 302, a perception layer 304, and one or more sensors 306.

Starting at the "lowest" level in this architecture, the sensors 306 may be a wide variety of sensors that provide information to the control system 300 so that the control system 300 may properly control the self-driving vehicle. These sensors 306 may include sensors, such as cameras (e.g., visible light video cameras, panoramic cameras, infra-red cameras, etc.), GPS (or other positioning systems), inertial measuring units, sonar, radar (both short- and long-range), LiDAR, and others. It will be understood that self-driving vehicles may include only a subset of these sensors and sensor types. Additionally, combinations of sensors (i.e., "sensor fusion") may be used to provide input to the control system 300, with combination generally taking place either in the perception layer 304, or as a combined sensor in the sensors 306.

In accordance with the present technology, at least one of the sensors 306 is a scanning sensor 308, such as a LiDAR or radar, which sweeps over an area to be scanned, typically in a cyclic manner. While the sensors 306 may include numerous such scanning sensors, for purposes of this disclosure, and to enhance understanding of the present technology, only a single scanning sensor 308 will be discussed. It will be understood that substantially the same methods and systems could be used with multiple scanning sensors. Further, for convenience, the scanning sensor 308 that will be discussed is a LiDAR scanning system. LiDAR is frequently used in self-driving vehicles. However, it will be understood that substantially the same systems and methods could be used with other types of scanning sensors.

As has been mentioned above, for the scanning sensor 308, the scanning process is cyclical. This means that the scanning sensor 308 completes sweeping over an area to be scanned, and then starts the scanning sweep again, in a cyclic manner. For a LiDAR system, a complete scanning cycle may take, e.g. 100 ms, though it will be understood that faster and slower LiDAR systems may also be used.

The perception layer 304 is configured to receive and analyze information from the sensors 306, including the scanning sensor 308. The perception layer 304 communicates with the sensors 306, and performs an analysis of raw data from the sensors 306, including the scanning sensor 308. The raw data from the scanning sensor 308 may include point cloud data, such as is produced by a LiDAR scanner. Such point cloud data may include a large collection of 3D points describing sensed objects or surfaces. The perception layer 304 analyzes these point clouds to classify (i.e. recognize) objects around the self-driving vehicle, such as other cars, static obstacles, road signs, etc. This classification may be done using, e.g., conventional machine learning algorithms. Once the perception layer 304 has performed its analysis of the raw sensor data, the results of the analysis are sent to the behavior layer 302.

From the perspective of timing, assuming that conventional machine learning algorithms are being employed, an average analysis time for the perception layer 304 may be determined. This average analysis time may be predetermined through benchmarking, or may be continuously updated to reflect the actual times taken to perform the analysis. The time required for the perception layer 304 to perform an analysis may vary according to the sensor input or combination of sensor inputs being analyzed, and according to requests that may be sent from the behavior layer 302.

The behavior layer 302 utilizes the processed data from the perception layer to make a decision about a maneuver to be performed. This may be done using a variety of methods or algorithms, depending, e.g., on the vehicle type.

Generally, the behavior layer 302 operates in a manner that is not specifically synchronized with the cycles of the scanning sensor 308. Thus, the behavior layer 302 can initiate a decision-making process at any point in the current scanning cycle of the scanning sensor 308.

It may be useful for the decision-making process to be based on the most current data available at the time that the decision is made. Accordingly, one goal of the present technology is to facilitate the use of the most up-to-date data available in making decisions about a maneuver.

Scan Segments

Figure 4:
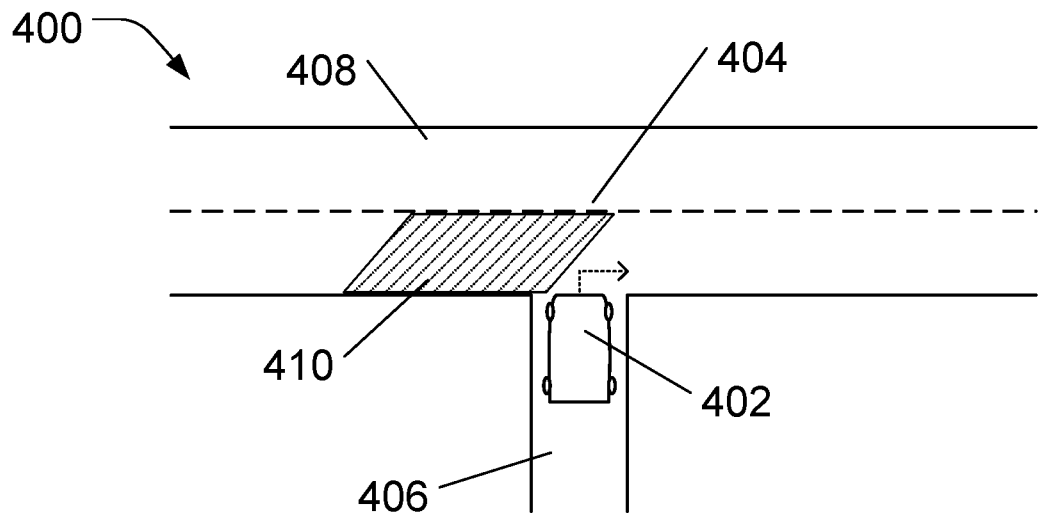
FIG. 4 depicts a scenario demonstrating the operation of some implementations of the present technology.

Referring to FIG. 4, a scenario demonstrating the operation of the present technology is described. The diagram 400 shows a self-driving vehicle 402 that is approaching a T-shaped crossroad 404 where a secondary road 406 on which the self-driving vehicle has been traveling meets with a main road 408. To continue at the crossroad 404, the behavior layer in the control system of the self-driving vehicle 402 plans a maneuver—"turn right." In other words, the self-driving vehicle needs to turn right and merge into a stream of traffic that moves on the main road 408 from left to right. To perform this maneuver, the self-driving vehicle has to check that the segment 410 on the main road 408 is empty. The segment 410 of the space surrounding the self-driving vehicle poses the highest risk for the planned maneuver.

In accordance with the present technology, to perform the maneuver based on the most up-to-data scan data, the control system of the self-driving vehicle (such as the control system described with reference to FIG. 3) performs a number of actions. The behavior layer transmits a request to the perception layer for the most up-to-date information on the segment 410. The perception layer sends a request for the raw data associated with the segment 410 to the scanning sensor.

In "normal" operation, in the absence of any request for information, the scanning sensor performs its regular cyclical scanning. Thus, when a scanning cycle is complete, the full set of scan data obtained during that scanning cycle is sent to the perception layer for analysis. This process is repeated periodically, with some default frequency, e.g. every 100 ms. This means that, depending on where the segment 410 is located within a scanning cycle, the data may be as much as a full cycle old by the time it is received by the perception layer. In accordance with the present technology, when there is a request for scan information so that a decision can be made, the perception layer may use partial data from the scanning sensor to provide more recent information to the behavior layer for making a decision.

Figure 5:
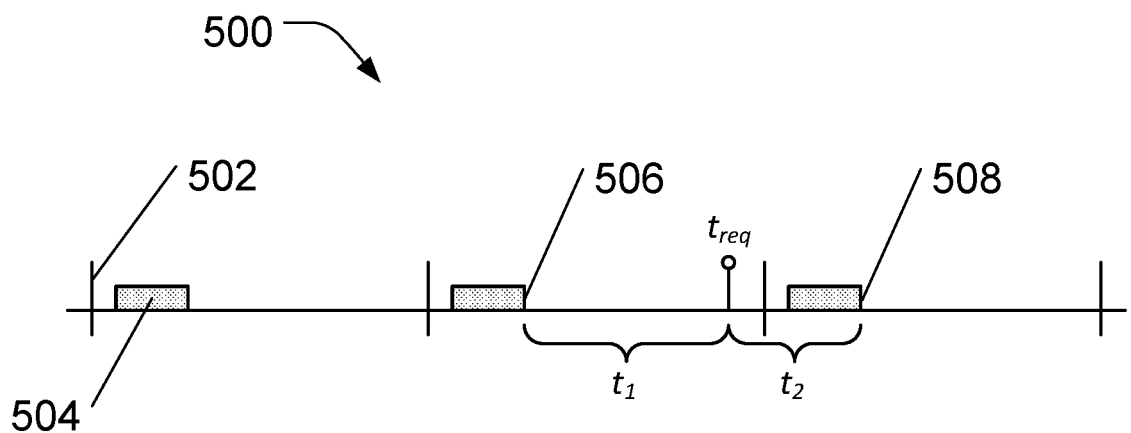
FIGS. 5-7 show example timelines illustrating the operation of various implementations of the present technology.
Figure 6:
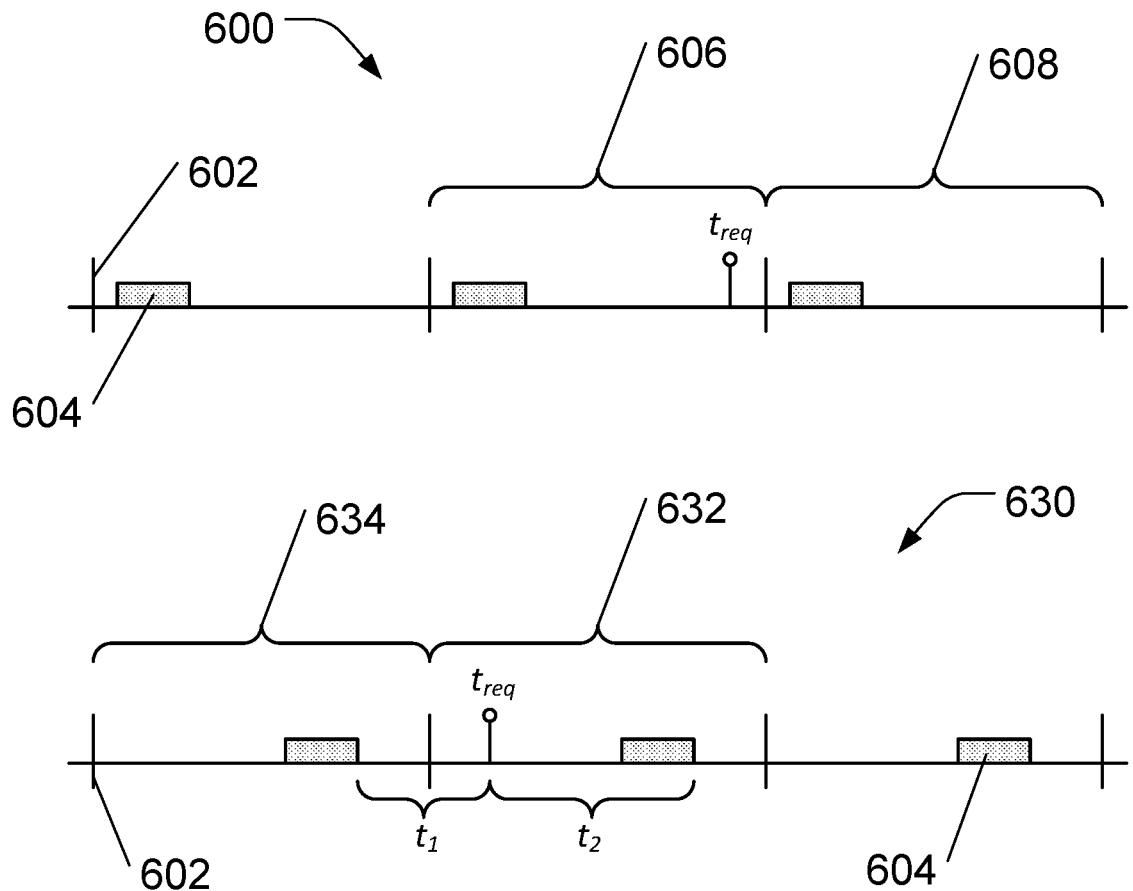
Figure 7:
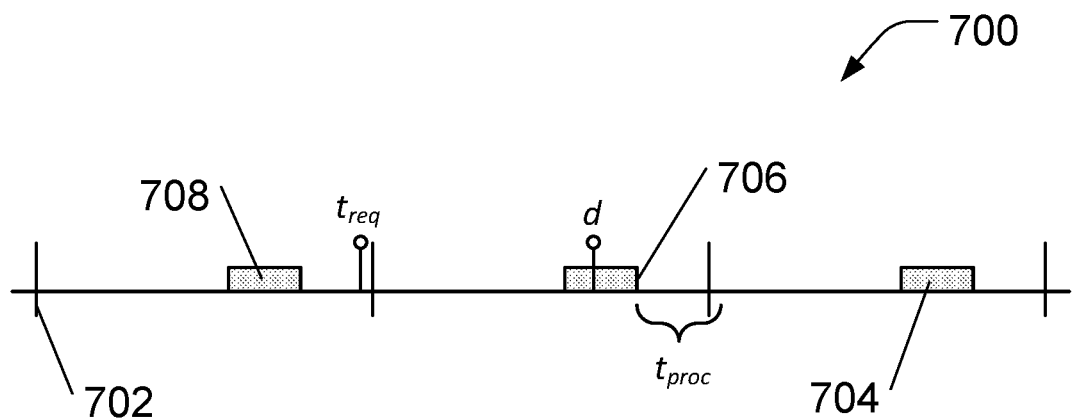

FIGS. 5-7 show example timelines for various implementations of the present technology. In FIG. 5, an example timeline 500 for a first implementation is shown, in which the perception layer and/or the scanning sensor (i.e., the method could be implemented on either or on both in cooperation) compares the amount of time since the last scan of the requested segment (e.g., the segment 410 from FIG. 4) to the amount of time that will pass until the next scan of the requested segment to determine which data to use. The timeline 500 shows the time of the request from the behavior layer as $t_{req}$. The hatch marks 502 mark the ends of consecutive cycles of the scanning sensor, and the shaded areas 504 show the time during each cycle in which the requested segment is scanned. As can be seen, the amount of time between $t_{req}$ and the end of the most recent previous scan of the requested segment 506 is marked as $t_1$. The amount of time that will pass between $t_{req}$ and the end of the next scan of the requested segment 508 is marked as $t_2$. It should be noted that since the next scan of the requested segment 508 is in the future at the time that $t_{req}$ arrives, $t_2$ is a predicted time—though a predicted time that can be made with a high degree of confidence, given the cyclic nature of the scanning.

According to this implementation, if $t_1 < t_2$, then the data from the previous scan of the requested segment may be used. Otherwise (i.e., $t_1 > t_2$), the perception layer waits for the next scan of the requested segment to complete, and then uses the next scan of the requested segment. In the example shown in FIG. 5, $t_1 > t_2$, so the perception layer will wait for the next scan of the requested segment.

Applying the logic of this first implementation, the minimum time from the request to the analyzed information being delivered to the behavior layer is generally the time that it takes the perception layer to analyze the data. This will occur when $t_1 < t_2$, since the data for the requested segment should be immediately available to the perception layer. In some instances, it may be possible to reduce this time even further, if $t_1 < t_2$ and the perception layer has already performed the analysis of the previous scan of the requested data. Generally, the maximum time from the request to the analyzed information being delivered to the behavior layer will be $t_2$ plus the time that it takes for the perception layer to analyze the data for the requested segment. The analyzed information provided to the behavior layer should be at least as recent as one cycle time plus the time taken for analysis, and should, on average, be more recent.

FIG. 6 shows example timelines 600 and 630 for a second implementation, which is similar to the first implementation, but immediately uses the available scan data if the requested segment has already been scanned during the current scanning cycle. This can result in information that is less recent than in the first implementation, but that is (on average) provided earlier to the behavior layer 302. The example timeline 600 shows such a scenario.

As above, the timelines 600 and 630 show the time of the request from the behavior layer 302 as $t_{req}$. The hatch marks 602 mark the ends of consecutive cycles of the scanning sensor, and the shaded areas 604 show the time during each cycle in which the requested segment is scanned. On the example timeline 600, $t_{req}$ occurs in a current scanning cycle 606 in which the requested segment has already been scanned. In accordance with this second implementation, the perception layer 304 extracts the scan data for the requested segment from the current scanning cycle 606 without waiting for the current scanning cycle 606 to complete. This is true even if, as on the timeline 600, the amount of time that has passed since the requested segment was scanned in the current scanning cycle 606 is greater than the amount of time that will pass until the requested segment is scanned in a next scanning cycle 608. This provides a rapid response to the request with data that is less than one scanning cycle old.

The example timeline 630 shows a second scenario, in which $t_{req}$ occurs in a current scanning cycle 632 before the requested segment has been scanned in the current scanning cycle 632. When this occurs, the perception layer 304 decides between sending the scan data for the requested segment from a prior scanning cycle 634 or waiting for the requested segment to be scanned in the current scanning cycle 632. This decision is handled in a manner similar to the first implementation described above with reference to FIG. 5. The amount of time between $t_{req}$ and the end of the most recent previous scan of the requested segment is marked as tr. The amount of time between $t_{req}$ and the end of the next scan of the requested segment is marked as $t_2$. If $t_1 \leq t_2$, then the data from the previous scan of the requested segment may be used. Otherwise, if $t_1 > t_2$, the perception layer waits for the scan of the requested segment in the current scanning cycle 632 to complete, and then uses the data from the current scanning cycle 632. In the example timeline 630, $t_1 < t_2$, so the perception layer will immediately use the data from the previous scan.

In this implementation, the minimum time from the request to the analyzed information being delivered to the behavior layer is generally the time that it takes the perception layer to analyze the data. This will occur both when $t_{req}$ occurs in the current scanning cycle 632 after the requested segment has been scanned, and when $t_1 < t_2$, since the data for the requested segment should be immediately available to the perception layer 304. In some instances, it may be possible to reduce this time even further, if $t_1 < t_2$ and the perception layer 304 has already performed the analysis of the previous scan of the requested data. Generally, the maximum time from the request to the analyzed information being delivered to the behavior layer will be $t_2$ plus the time that it takes for the perception layer to analyze the data for the requested segment. The analyzed information provided to the behavior layer should be at least as recent as one cycle time plus the time taken for analysis, and should, on average, be more recent.

In accordance with the present technology, it may be advantageous for there to be as little time between the request and the perception layer's response to the request as possible. The behavior layer 302 may have only a small amount of time in which to make a decision. This would suggest using data for the requested segment that has already been scanned, since there is no need to wait for this data. However, it is also advantageous for the data that is used to make a decision to not be too old or obsolete. Conditions on roads and in other environments in which a self-driving vehicle operates may change rapidly. This would suggest waiting for new data to come in, when possible. The implementations of FIGS. 5 and 6 attempt to balance these concerns, with the implementation of FIG. 6 being somewhat more heavily weighted toward providing a quick response to the behavior layer.

Referring now to FIG. 7, an example timeline 700 for a third implementation is described. In this implementation, the behavior layer 302 sends a request at time $t_{req}$. The request includes both information on the segment of space for which information is requested and a deadline, d, by which the information must be returned. The time taken by the perception layer to process the scanned segment data is labeled $t_{proc}$. As above, the hatch marks 702 mark the ends of consecutive cycles of the scanning sensor, and the shaded areas 704 shows the time during each cycle in which the requested segment is scanned.

In accordance with the implementation shown in FIG. 7, the perception layer 304 may wait for a future scan of the requested segment to finish, in either the current cycle or a subsequent cycle, provided that the end of scanning the future scan of the requested segment 706, plus $t_{proc}$ is at or before the deadline, d. Otherwise, the perception layer 304 uses data from a previous scan of the requested segment 708 that has already been completed, whether in the current scanning cycle or in a previous scanning cycle. This is the situation shown in the example timeline 700. From $t_{req}$, waiting for the next scan of the requested segment 706, plus $t_{proc}$ would cause the information to be sent to the behavior layer later than the deadline, d. Consequently, the data from a previous scan of the requested segment 708 will be used.

The implementation shown in FIG. 7 will provide the behavior layer with the latest information available from the scanning sensor that can be provided before it is needed by the behavior layer. However, the cost of this approach is that the behavior layer needs to specify a deadline, d, by which the information is needed.

Figure 8:
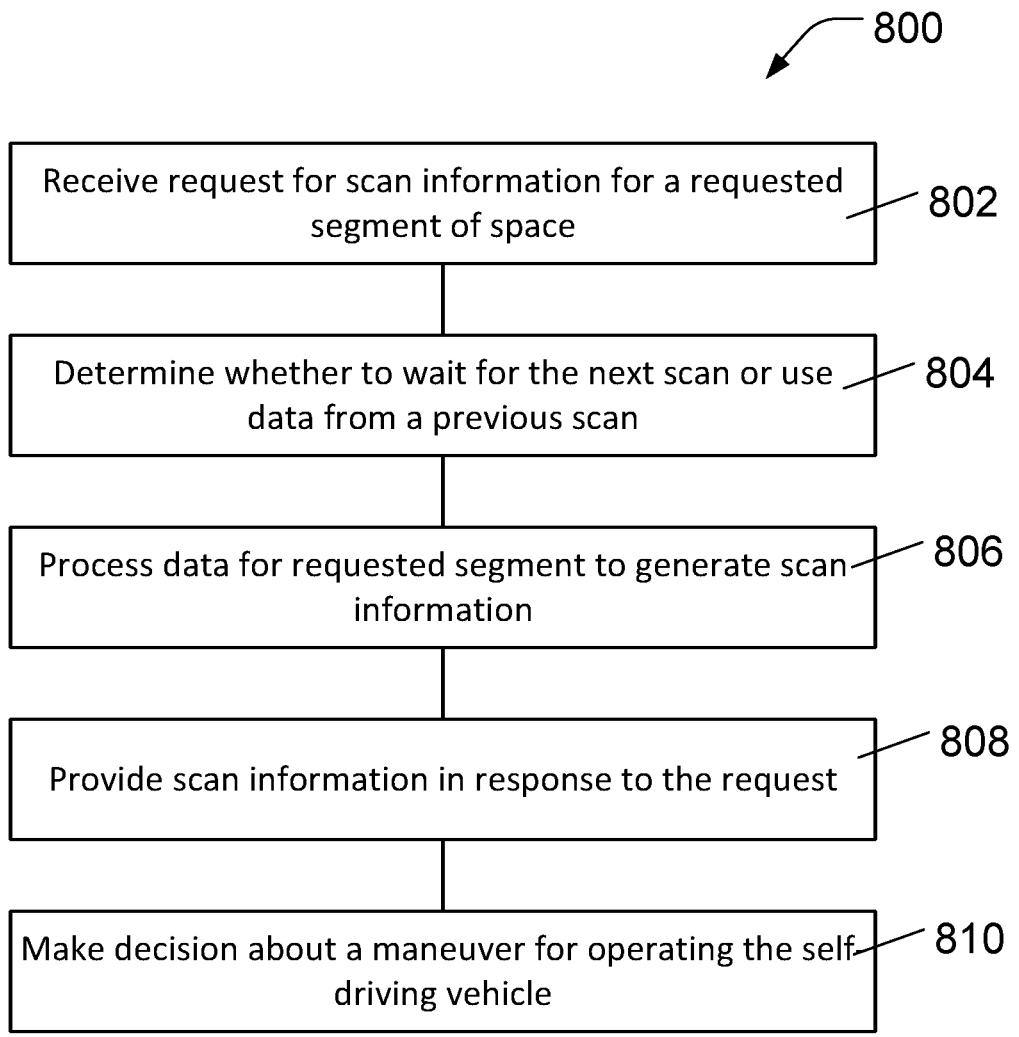
FIG. 8 is a flowchart of a method of operating a self-driving vehicle in accordance with some implementations of the present technology.

FIG. 8 shows a flowchart 800 for a generalized method of operating a self-driving vehicle in accordance with various implementations of the present technology. The self-driving vehicle may be, for example, the self-driving vehicle 200 described above with reference to FIG. 2, including the computing device 210 and the LiDAR device 230. The self-driving vehicle 200 may be controlled by a control system such as the control system 300 of FIG. 3, which may execute on the computing device 210. The scanning sensor scans a space around the self-driving vehicle in consecutive scanning cycles.

In block 802, a request is received for scan information associated with a requested segment of space. This request will generally be received by the perception layer of the control system from the behavior layer of the control system, but other arrangements are also possible. The segment of space is an area in the environment surrounding the self-driving vehicle that can be scanned by the scanning sensor, and that is relevant to a decision that is being made about the operation of the self-driving vehicle.

In block 804, a determination is made whether to wait for the next scan of the requested segment and use the data from the next scan of the requested segment, or to extract and use data from a previous scan of the requested segment. The next scan of the requested segment may occur later in a present scanning cycle, or in a subsequent scanning cycle, and the previous scan of the requested segment may have already occurred in the current scanning cycle or in a previous scanning cycle. In accordance with the present technology, there may be various ways in which this decision can be made, as detailed above with reference to FIGS. 5-7 and as further detailed below. In systems having multiple scanning sensors, different ways of making this decision may be used for different scanning sensors.

As was discussed above, the way in which the decision is made may balance responding to the request as quickly as possible with providing the most recent data possible, even if it may be necessary to wait for those data. This balance may be affected by the way in which the decision is made, such that some methods may be more heavily weighted toward responding to the request quickly, while other methods may be more heavily weighted toward providing the most recent data. In some implementations, the method used for making the decision may be an adjustable parameter of the control system of the self-driving vehicle.

In block 806, the data for the requested segment are processed to generate scan information for the requested segment. This processing may occur, for example, in the perception layer of the control system, though it will be understood that other arrangements are also possible. The processing may involve various forms of data analysis. When the scanning sensor is a LiDAR, for example, the processing may involve analyzing a LiDAR point cloud for the requested segment to classify (i.e. recognize) objects around the self-driving vehicle, such as other cars, static obstacles, road signs, etc. This classification may be done using, e.g., conventional machine learning algorithms.

In block 808, the scan information is provided in response to the request. For example, this may involve the perception layer sending the scan information to the behavior layer of the control system, though other arrangements are also possible.

In block 810, a decision about a maneuver to be performed is made based, at least in part, on the scan information. This decision is used for operating the self-driving vehicle.

Figure 9:
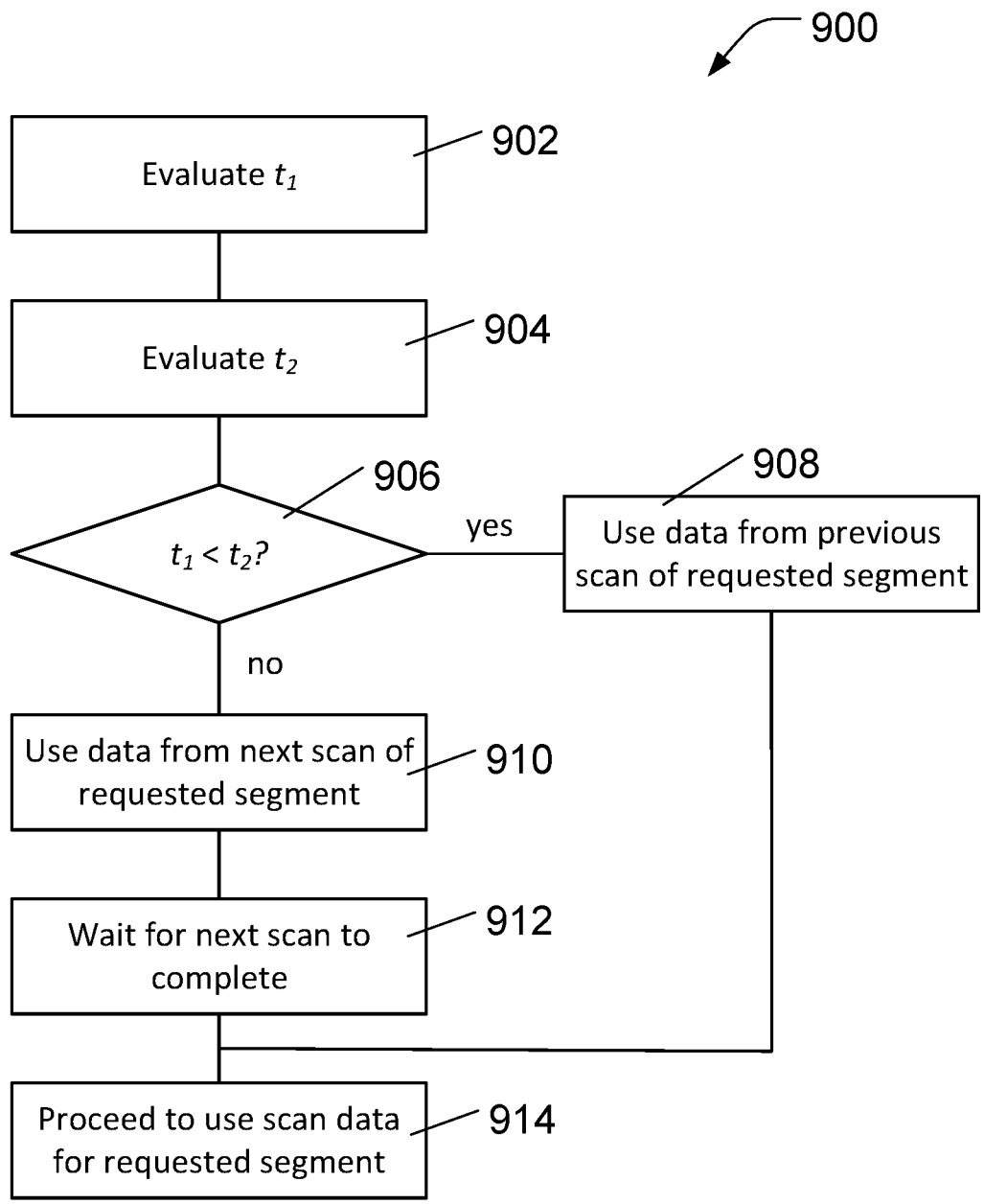
FIGS. 9-11 are flowcharts of methods for deciding whether to wait for a next scan of a requested segment or use data from a previous scan of the requested segment, in accordance with various implementations of the present technology.

FIG. 9 shows a flowchart 900 for a first implementation of a method for deciding whether to wait for the next scan of the requested segment or use data from a previous scan of the requested segment. This method could be used, for example, in block 804 of the flowchart 800 described with reference to FIG. 8. The flowchart 900 generally corresponds to the implementation described above with reference to FIG. 5.

In block 902, a first time parameter (denoted as $t_1$ in the flowchart 900), indicative of time passed since a previous scan of the requested segment is evaluated. The time at which a previous scan of the requested segment was completed can be determined based on a known speed of scanning over the area covered by the scanning sensor. Alternatively, some LiDAR point clouds may include timing data that can be used to determine the first time parameter. It will be understood that other methods for determining the first time parameter could also be used.

In block 904, a second time parameter (denoted as $t_2$ in the flowchart 900), indicative of a time to availability of data for a next scan of the requested segment is evaluated. Since the second time parameter relates to an event that has not yet occurred, the time to availability of data for the next scan of the requested segment is estimated in the evaluation of the second time parameter. This estimation can be made with a reasonably high degree of certainty, because the time at which a particular segment of the scan area of the scanning sensor will be scanned within a scanning cycle is generally known and/or easy to determine given the cyclic nature of the scanning.

In block 906, the first time parameter is compared to the second time parameter. If the first time parameter is less than the second time parameter, then in block 908, a determination is made to use data from the previous scan of the requested segment. These data are generally immediately available, either from the scanning sensor or in the perception layer of the control system. It will also be understood that although the determination is described as being based on whether the first time parameter is less than the second time parameter, it is also contemplated that the same determination could be made if the first parameter and the second parameter are equal.

Otherwise, if the first time parameter is greater than the second time parameter, then in block 910, a determination is made to use data from the next scan of the requested segment. It will also be understood that although the determination is described as being based on whether the first time parameter is greater than the second time parameter, it is also contemplated that the same determination could be made if the first parameter and the second parameter are equal.

In block 912, the system waits for the scanning sensor to complete the next scan of the requested segment.

In block 914, the control system proceeds to use the scan data of the requested segment to operate the self-driving vehicle. This may involve, e.g., processing the raw scan data to generate scan information, and sending the scan information to the behavior layer, as discussed above with reference to FIG. 8.

Figure 10:
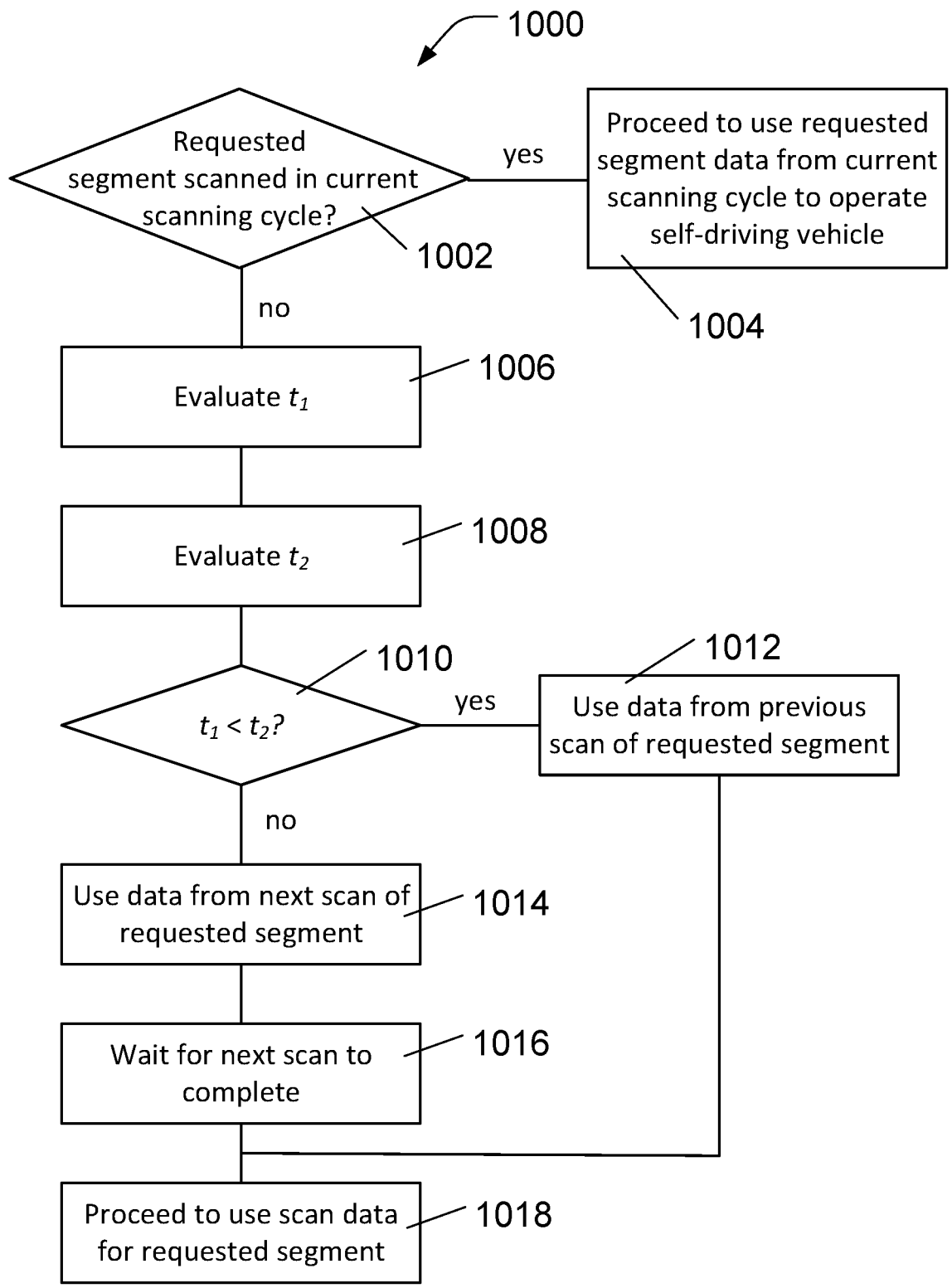

FIG. 10 shows a flowchart 1000 for a second implementation of a method for deciding whether to wait for the next scan of the requested segment or use data from a previous scan of the requested segment. This method could be used, for example, in block 804 of the flowchart 800 described with reference to FIG. 8. The flowchart 1000 generally corresponds to the implementation described above with reference to FIG. 6.

In block 1002, the control system determines whether the requested segment has been scanned during a current scanning cycle. If so, then in block 1004, the control system proceeds to use the data for the requested segment from the current scanning cycle to operate the self-driving vehicle.

Otherwise, in block 1006, a first time parameter (denoted $t_1$ in the flowchart 1000) indicative of time passed since a scan of the requested segment during a previous scanning cycle is evaluated. As in the implementation described with reference to FIG. 9, this can be determined based on a known speed of scanning over the area covered by the scanning sensor and/or based on data provided by the scanning sensor. It will be understood that other methods for determining the first time parameter could also be used.

In block 1008, a second time parameter (denoted $t_2$ in the flowchart 1000) indicative of a time to availability of data for the requested segment during the current scanning cycle is evaluated. As discussed above, the second time parameter is estimated, but the estimate can be made with a reasonably high degree of certainty.

In block 1010, the first time parameter is compared to the second time parameter. If the first time parameter is less than the second time parameter, then in block 1012, a determination is made to use data from the scan of the requested segment during the previous scanning cycle. It will also be understood that although the determination is described as being based on whether the first time parameter is less than the second time parameter, it is also contemplated that the same determination could be made if the first parameter and the second parameter are equal.

Otherwise, if the first time parameter is greater than the second time parameter, then in block 1014, a determination is made to use data from the scan of the requested segment during the current scanning cycle. It will also be understood that although the determination is described as being based on whether the first time parameter is greater than the second time parameter, it is also contemplated that the same determination could be made if the first parameter and the second parameter are equal.

In block 1016, the system waits for the scanning sensor to complete scanning the scan of the requested segment during the current scanning cycle.

In block 1018, the control system proceeds to use the scan data of the requested segment to operate the self-driving vehicle.

Figure 11:
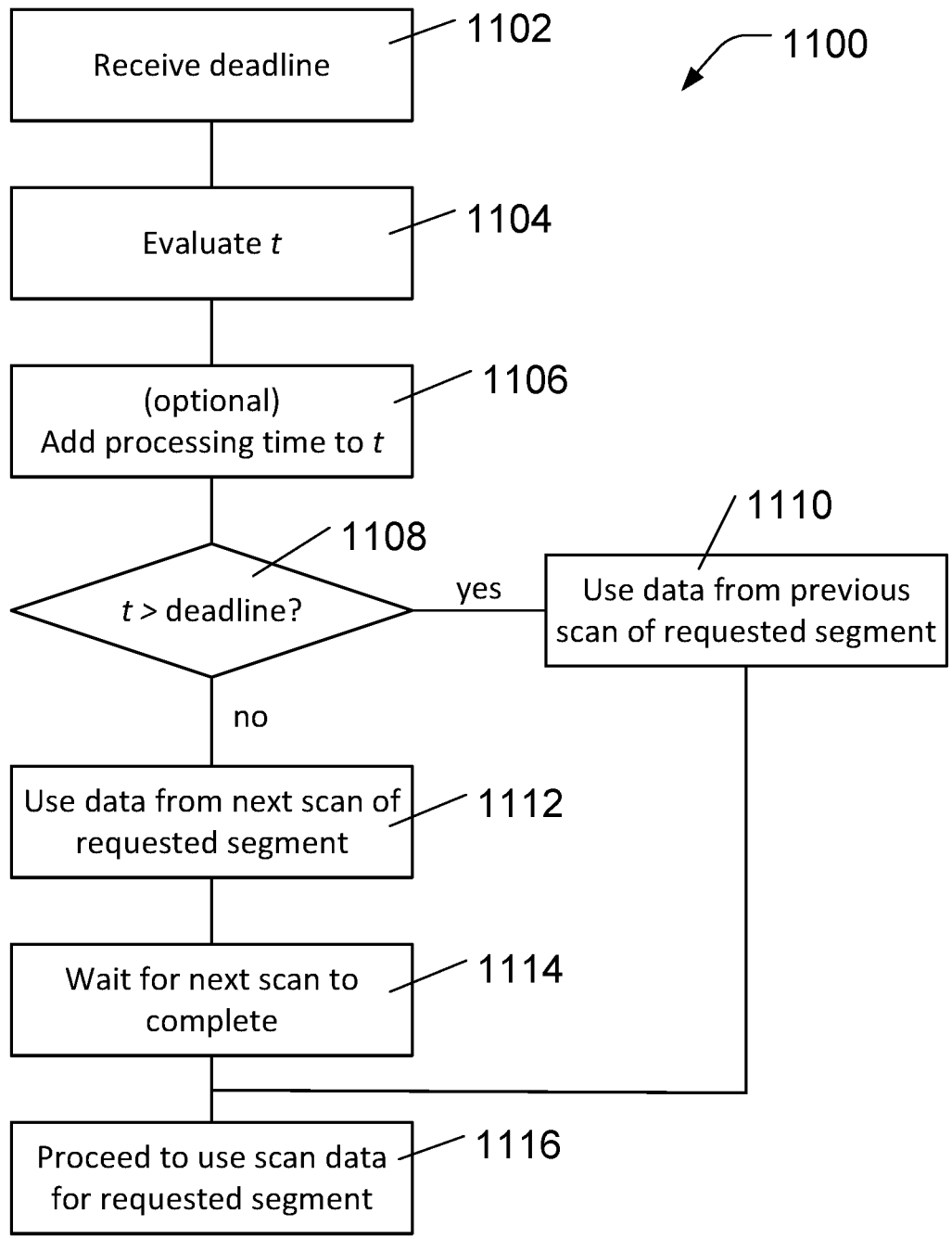

FIG. 11 shows a flowchart 1100 for a third implementation of a method for deciding whether to wait for the next scan of the requested segment or use data from a previous scan of the requested segment. This method could be used, for example, in block 804 of the flowchart 800 described above with reference to FIG. 8. The flowchart 1100 generally corresponds to the implementation described above with reference to FIG. 7.

In block 1102, the control system receives as part of the request for scan information associated with a segment of space, a deadline by which a response to the request with scan information on the requested segment is to be provided. This request is discussed in greater detail above, with reference to FIG. 8.

In block 1104, a time parameter (denoted as t in the flowchart 1100) indicative of a time of availability of data for a next scan of the requested segment is evaluated. Because the time to availability of data for the next scan is an event that has not yet taken place, this time parameter is estimated.

In block 1106, a processing time is optionally added to the time parameter, to account for time taken to process the raw data for the next scan to generate scan information for the next scan. This step is optional, and in some implementations, the processing time may be negligible compared, e.g., to the time taken to scan the data. However, given the amount of data that may be present in, e.g., a LiDAR point cloud, even for a limited segment, the amount of time taken to process the data may be significant. In determining whether the deadline will be met.

In block 1108, the time parameter is compared to the deadline, and in block 1110, if the time parameter indicates that the scan information will not be available by the deadline, a determination is made to use data from the previous scan of the requested segment. Otherwise, in block 1112, a determination is made to use data from the next scan of the requested segment, and in block 1114, the system waits for the scanning sensor to complete scanning the next scan of the request segment.

In block 1116, the control system proceeds to use the scan data of the requested segment to operate the self-driving vehicle.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of operating a self-driving vehicle, the method executable on a computing device associated with the self-driving vehicle, the self-driving vehicle being equipped with a scanning sensor that scans a space around the self-driving vehicle in consecutive scanning cycles, the method comprising:

receiving a request for scan information associated with a requested segment of space, receiving the request further comprising receiving a deadline by which the scan information associated with the requested segment of space is to be provided;

determining whether to wait for a next scan of the requested segment by the scanning sensor and use scan data from the next scan of the requested segment, or to extract and use scan data from a previous scan of the requested segment by the scanning sensor, the determination comprises:

evaluating a time parameter indicative of a time of availability of data for the next scan of the requested segment by the scanning sensor;

comparing the time parameter to the deadline; and in response to the time parameter indicating that the scan information will not be available by the deadline, making a determination to use data from the previous scan of the requested segment;

processing the scan data to generate the scan information for the requested segment, processing the scan data comprising analyzing the scan data in a perception layer of a control system that operates the self-driving vehicle, the perception layer classifying objects around the self-driving vehicle based at least in part on the scan data;

providing the scan information for the requested segment in response to the request; and operating the self-driving vehicle in accordance with a decision made about a maneuver to be performed by the self-driving vehicle based, at least in part, on the scan information, the decision being made in a behavior layer of a control system that operates the self-driving vehicle.

2. The method of claim 1, wherein determining whether to wait for the next scan of the requested segment comprises:

evaluating a first time parameter indicative of time passed since the previous scan of the requested segment by the scanning sensor;

evaluating a second time parameter indicative of a time to availability of data for the next scan of the requested segment by the scanning sensor; and making a determination based, at least in part, on the first time parameter and the second time parameter.

3. The method of claim 2, wherein making the determination based, at least in part, on the first time parameter and the second time parameter comprises:

comparing the first time parameter to the second time parameter; and determining to use data from the previous scan of the requested segment in response to the first time parameter being less than the second time parameter.

4. The method of claim 2, wherein making the determination based, at least in part, on the first time parameter and the second time parameter comprises:

comparing the first time parameter to the second time parameter; and determining to use data from the next scan of the requested segment in response to the first time parameter being greater than the second time parameter.

5. The method of claim 1, wherein determining whether to wait for the next scan of the requested segment comprises:

determining whether the requested segment has been scanned during a current scanning cycle; and making a determination to use previously scanned data from the current scanning cycle for the requested segment if the requested segment has been scanned during the current scanning cycle.

6. The method of claim 5, wherein in response to the requested segment not having been scanned during the current scanning cycle, determining whether to wait for the next scan of the requested segment further comprises:

evaluating a first time parameter indicative of time passed from scanning the requested segment in a previous scanning cycle; and determining whether to wait for the next scan of the requested segment based, at least in part, on the first time parameter.

7. The method of claim 6, wherein determining whether to wait for the next scan of the requested segment based, at least in part, on the first time parameter comprises:

evaluating a second time parameter indicative of a time to availability of data for the requested segment during the current scanning cycle; and comparing the first time parameter to the second time parameter.

8. The method of claim 7, wherein in response to the first time parameter being greater than the second time parameter, a determination is made to wait for the data for the requested segment during the current scanning cycle.

9. The method of claim 7, wherein in response to the first time parameter being less than the second time parameter, a determination is made to use data for the requested segment from the previous scanning cycle.

10. The method of claim 1, wherein evaluating the time parameter further comprises adding a processing time to the time parameter.

11. The method of claim 1, wherein the scanning sensor comprises a LiDAR device.

12. The method of claim 11, wherein the scan data comprises a LiDAR point cloud.

13. A self-driving vehicle comprising:

a LiDAR device configured to scan a space around the self-driving vehicle in consecutive scanning cycles; and a control system that operates the self-driving vehicle, the control system comprising a computing device including a processor and a memory, the memory storing programmed instructions that when executed by the processor cause the control system to:

receive a request from a behavior layer of the control system in a perception layer of the control system for scan information associated with a requested segment of space;

determine in the perception layer whether to wait for a next scan of the requested segment by the LiDAR device and use scan data from the next scan of the requested segment, or to extract and use scan data from a previous scan of the requested segment by the LiDAR device;

process the scan data in the perception layer to generate the scan information for the requested segment;

provide the scan information to the behavior layer for the requested segment in response to the request; and operate the self-driving vehicle in accordance with a decision made about a maneuver to be performed by the self-driving vehicle in the behavior layer based, at least in part, on the scan information, the memory further storing programmed instructions that when executed by the processor cause the control system to:

receive a deadline in the perception layer, the deadline providing a time by which the scan information associated with the requested segment of space is to be provided to the behavior layer; and determine whether to wait for the next scan of the requested segment at least in part by:

evaluating a time parameter indicative of a time of availability of data for the next scan of the requested segment by the LiDAR device;

comparing the time parameter to the deadline; and in response to the time parameter indicating that the scan information will not be available by the deadline, making a determination to use data from the previous scan of the requested segment.

14. The self-driving vehicle of claim 13, wherein the memory further stores programmed instructions that when executed by the processor cause the control system to determine whether to wait for the next scan of the requested segment at least in part by:

evaluating a first time parameter indicative of time passed since the previous scan of the requested segment by the LiDAR device;

evaluating a second time parameter indicative of a time to availability of data for the next scan of the requested segment by the LiDAR device;

comparing the first time parameter to the second time parameter;

determining to use data from the previous scan of the requested segment in response to the first time parameter being less than the second time parameter; and determining to use data from the next scan of the requested segment in response to the first time parameter being greater than the second time parameter.

15. The self-driving vehicle of claim 13, wherein the memory further stores programmed instructions that when executed by the processor cause the control system to determine whether to wait for the next scan of the requested segment at least in part by:

determining whether the requested segment has been scanned during a current scanning cycle;

in response to the requested segment having been scanned during the current scanning cycle, making a determination to use previously scanned data from the current scanning cycle for the requested segment; and in response to the requested segment not having been scanned during the current scanning cycle, determining whether to wait for the next scan of the requested segment by:

evaluating a first time parameter indicative of time passed from scanning the requested segment in a previous scanning cycle;

evaluating a second time parameter indicative of a time to availability of data for the requested segment during the current scanning cycle;

comparing the first time parameter to the second time parameter;

in response to the first time parameter being greater than the second time parameter, making a determination to wait for the data for the requested segment during the current scanning cycle; and in response to the first time parameter being less than the second time parameter, making a determination to use data for the requested segment from the previous scanning cycle.

* * * * *